United States Patent [19]

Circello et al.

[11] Patent Number: 5,592,634

[45] Date of Patent: Jan. 7, 1997

[54] ZERO-CYCLE MULTI-STATE BRANCH CACHE PREDICTION DATA PROCESSING SYSTEM AND METHOD THEREOF

[75] Inventors: Joseph C. Circello; David J. Schimke, both of Phoenix, Ariz.

[73] Assignee: Motorola Inc., Schaumburg, Ill.

[21] Appl. No.: 242,766

[22] Filed: May 16, 1994

[51] Int. Cl.$^6$ .................................. G06F 9/30; G06F 9/38
[52] U.S. Cl. .......................... 395/586; 395/445; 395/474; 395/841; 365/221; 364/578
[58] Field of Search .................................. 395/375, 445, 395/494, 841; 365/221; 364/578

[56] References Cited

U.S. PATENT DOCUMENTS

| 5,050,068 | 9/1991 | Dollas et al. | 395/375 |
| 5,101,341 | 3/1992 | Circello et al. | 395/375 |
| 5,142,634 | 8/1992 | Fitz et al. | 395/375 |
| 5,265,213 | 11/1993 | Weiser et al. | 395/375 |
| 5,327,386 | 7/1994 | Fudeyasu | 365/221 |
| 5,404,454 | 4/1995 | Parks | 395/841 |
| 5,442,756 | 8/1995 | Grochowski et al. | 395/375 |
| 5,442,760 | 8/1995 | Rustad et al. | 395/375 |
| 5,511,011 | 4/1996 | Saitoh | 364/578 |
| 5,542,067 | 7/1996 | Chappell et al. | 395/494 |
| 5,544,340 | 8/1996 | Doi et al. | 395/445 |

OTHER PUBLICATIONS

An Evaluation of Branch Architectures, DeRosa et al; 1987 ACM; pp. 10–16.

Branch Prediction Strategies and Branch Target Buffer Design; Lee et al; Computer, Jan. 1984, vol. 17, No. 1; pp. 6–22.

*Primary Examiner*—William M. Treat
*Assistant Examiner*—Saleh Najjar
*Attorney, Agent, or Firm*—Keith E. Witek

[57] ABSTRACT

A branch cache (40) has a plurality of storage levels (120, 122, 140, and/or 142) wherein at least two write registers (114 and 116) are used to perform a parallel write operation to at least two of the storage levels in the plurality of storage levels (120, 122, 140, and/or 142). The two write registers (114 and 116) are provided due to the fact that the branch cache 40 is implemented as a multi-state (typically five state—see FIG. 5) branch prediction unit having instruction folding. Instruction folding, as taught herein, allows a branch instruction which is predicted as being taken to be executed along with an instruction that precedes the branch in execution flow. The instruction which directly precedes the branch in execution flow is usually the instruction which is used to "fold" the branch. Effectively, this instruction folding allows branches, which are predicted as being taken, to be executed in zero clock cycles.

46 Claims, 6 Drawing Sheets

ZERO-CYCLE MULTI-STATE BRANCH CACHE PREDICTION DATA PROCESSING SYSTEM AND METHOD THEREOF

FIELD OF THE INVENTION

The present invention relates generally to data processing systems, and more particularly, to branch caches.

BACKGROUND OF THE INVENTION

In microprocessor design, the ability to execute code in an efficient and timely manner directly impacts processor performance. In order to process instructions in a timely manner, the branch cache was developed. The branch cache has a plurality of memory locations for storing data regarding branch instructions used in user code, where user code is executed in the microprocessor to perform some function. The stored data in the branch cache is typically a branch address and a prediction of the branch result for each encountered branch. A two state model is typically used wherein a particular branch is either predicted as being taken or predicted as being not-taken depending upon a past history of the execution of the particular branch instruction. A branch instruction sends the flow of instruction execution in a microprocessor in one of two possible directions (i.e., if condition A goto address B else goto address C). If these two "arbitrary" directions B and C are not predicated ahead of branch execution by the processor, then the processor must cease pipeline operation after the branch instruction is entered into the pipeline until the branch's direction is determined (usually in the last stage of the pipeline execution unit). This discontinuation of pipeline processing reduces processor performance.

By using a branch cache, which predicts the direction of a branch accurately and correctly before the branch is executed, the microprocessor's pipeline execution unit(s) can continue to operate at full pipelined/full speed mode without having to cease pipelining for the branch. If the prediction of branch direction is correct most of the time, then performance improvements are gained due to the uninterrupted continuance of the pipelined mode. If prediction is incorrect most of the time, then performance may be hindered. Hindrance is due to the fact that the branch was predicted incorrectly resulting in the pipeline containing incorrect instructions from an incorrect branch path. The pipeline therefore must be flushed or "backed up" to remove those incorrect instructions and start pipelining in the correct execution direction dictated by the branch instruction.

A improved branch cache, wherein performance is further improved and branch prediction is more accurate, is needed.

SUMMARY OF THE INVENTION

The previously mentioned disadvantages are overcome and other advantages achieved with the present invention. In one form, the present invention comprises data processing system having both an execution unit and a branch cache coupled to the execution unit. The branch cache has a plurality of storage locations, each storage location having a plurality of history bits to indicate whether a branch is likely to be taken or not likely to be taken, the branch cache being N way set associative wherein N is a finite positive integer greater than one, the branch cache having at least two registers for storing write address bits when writing to the branch cache, the at least two registers allowing the branch cache to write two branch cache entries in parallel.

In another form, the invention comprises a data processor. The data processor has a pipelined data execution unit and an address generation circuit coupled to the pipelined data execution unit. The address generation circuit having a multiplexer with a first input, a second input, a third input for receiving addresses from the pipelined execution unit, an address output, and a plurality of select lines which are used to determine which input of the first, second, and third inputs is connected to the address output. The address generation circuit also has an adder with an input coupled to the address output of the multiplexer. The adder circuit adding a constant to the address output to provide an incremented address output which is coupled to the first input of the multiplexer. The data processor has a branch cache coupled to the pipelined execution unit. The branch cache has an address output coupled to the second input of the multiplexer. The branch cache being an N×1 level cache which has a first register and a second register for performing parallel writes to the branch cache.

In yet another form, the invention comprises a method for prefetching instructions to improve performance of a data processor. The method begins by generating an instruction fetch address. An instruction is fetched from a location specified by the instruction fetch address. The instruction is executed. A state of the data processor as reflected in a programmer's model if the instruction is a branch instruction is examined to determine a direction of execution resulting from the branch instruction. A new entry is stored into a branch cache if the instruction is a branch instruction and the branch instruction has no previous history recorded in the branch cache. An existing branch cache entry is updated if the instruction is a branch instruction and the branch instruction has previous history recorded in the branch cache. The history recorded in the branch cache has more than two states wherein a first state identifies that the branch is likely to be taken and a second state which indicates that the branch is likely not to be taken. Two writes are performed to the branch cache in order to both create a new branch cache entry and invalidate a current branch cache entry if current branch cache entry changes from the first state to the second state or from the second state to the first state.

The present invention will be more clearly understood from the detailed description below in conjunction with the accompanying drawings.

DESCRIPTION OF A PREFERRED EMBODIMENT

Figure 1:
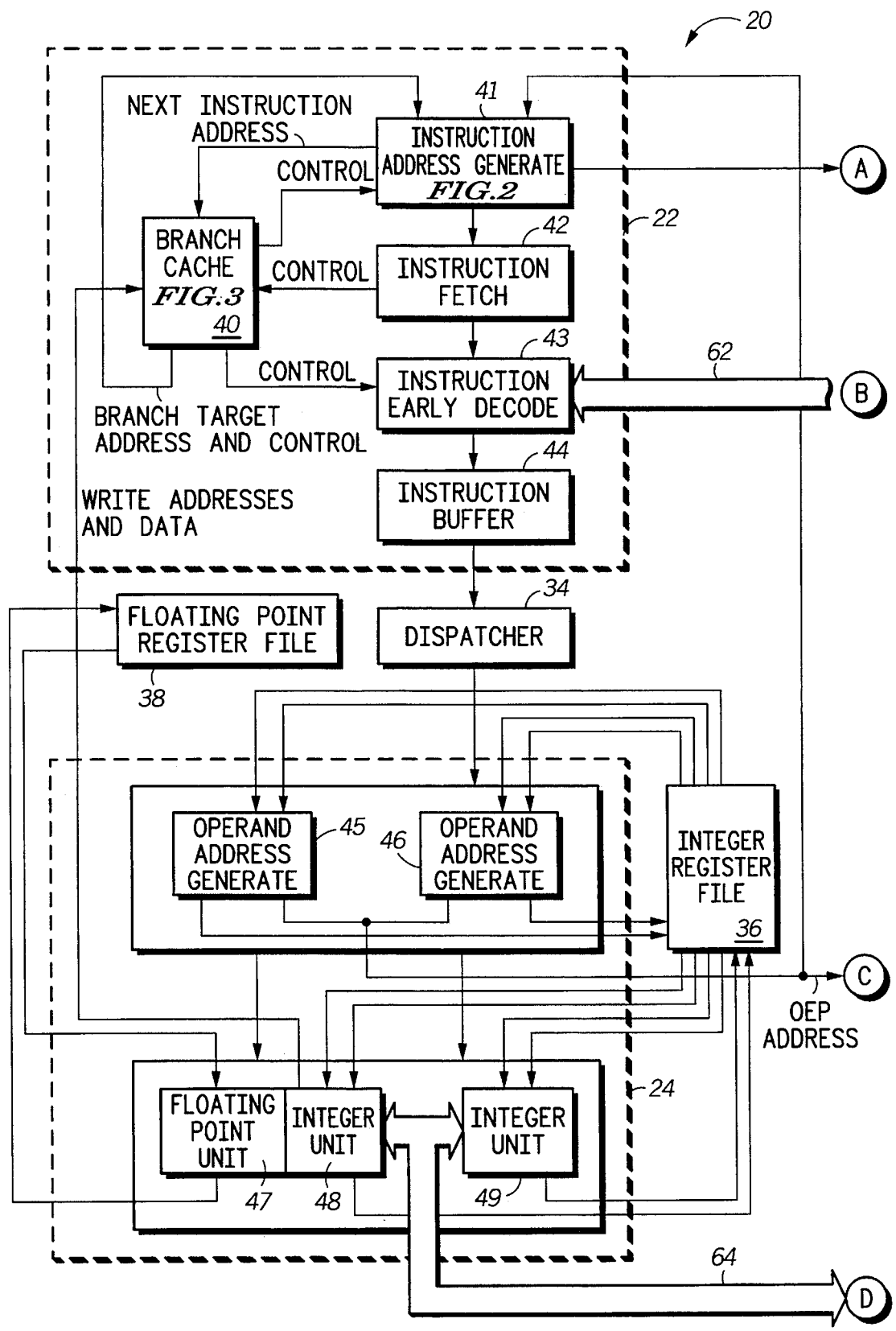
FIG. 1 (collectively FIGS. 1—1 through 1-2) illustrates, in a block diagram, a data processing system in accordance with the present invention.

Generally, the present invention provides a data processing system or a data processor which includes a branch cache. In systems containing pipelined processors, the efficient execution of branch instructions, especially conditional branch instructions, remains a key element in determining overall performance.

The application of a hardware branch cache to accelerate the performance of branch instructions is a well-known technique. This known approach provides a hardware table which associates a branch program counter address with a branch target address plus control information which "predicts", in a two-state manner, the direction of a branch (taken, not-taken) based on past execution history. The occurrence of a branch instruction in a processor results in two possible execution paths (i.e., one if the branch is taken and one if the branch is not taken).

Given these facts and this mechanism to predict the occurrence and direction of branches, the processor can prefetch instructions following the most-likely-to-be-executed instruction stream and thereby improve performance. In some cases, the branch cache will mis-predict meaning that the pipeline continued in the one of two branch paths that was incorrect. For example, the branch cache predicted the branch would be taken and, when executed, the branch was not taken. In this event of a mis-prediction (i.e., a prediction which is incorrect), the pipelined processor is aborted and then the processor resumes execution at the corrected instruction address. In other words, the pipeline must be flushed of the "incorrect" path and restarted down the correct path.

Processor performance is maximized when the branch cache can correctly predict the direction of branch instructions and minimize the number of mis-predictions which require the costly (i.e., time-consuming) process of aborting the pipeline and re-establishing the corrected instruction stream. Typically, the execution time for a correctly predicted branch is one machine cycle. In an effort to minimize the number of incorrect predictions, there are a variety of well-known techniques that can be applied. Most of these techniques involve the use of multi-state prediction models. These prediction models rely on expanding the history of past executions of a branch instruction to more accurately predict the direction for future executions of that same instruction.

In addition to the application of multi-state prediction models, there is an technique which allows the folding of branch instructions into a previous instruction using an expanded branch cache to provide even further increases in processor performance by effectively reducing the execution time of the branch instruction to zero. In effect the result of the branch is determined when the instruction preceding the branch in the instruction stream is executed. This "instruction folding" allows the branch instruction to be executed in zero cycles (i.e., the branch is not even loaded into the pipeline), as long as the prediction of branch direction is correct. The branch cache taught herein combines a instruction folding branch cache structure with a multi-state branch cache to increase branch prediction performance. The combination of these two techniques is not possible using current architectures since the combination results in the need for a branch cache which occasionally performs two parallel writes to the cache simultaneously, which is not taught or suggested by current technology.

Consider the following examples of relative processor performance using the machine cycles per instruction (CPI) methodology. Given the following assumptions, the average cycles per instruction for different processor configurations can be calculated (these parameters will vary depending upon type of software, programming style, compiler technology, and the like):

Non-branch instructions=0.80 (80% of code)
1.0 cycles per instruction for non-branch instructions
Branch instructions=0.20 (20% of code)
66.7% of branches are taken, 33.3% are non-taken The other assumptions used in this analysis are defined at the time of introduction and based on measured parameters. First, for a processor without a branch cache, let the branch execution times be defined as:

---
Taken branch = 2 cycles
Non-taken branch = 3 cycles
CPI for Processor without a Branch Cache
CPI = 0.80 * (1 cycle/inst)           // non-branches
    + 0.20 * (0.667 * 2 cycles/inst)  // taken branches
    + 0.333 * 3 cycles/inst)          // non-taken branches
---

Therefore, the Processor without a Branch Cache=1.27 cycles/instruction.

Second, consider a processor with a simple branch cache using a 2-state prediction model. For this 2-state model, it is assumed that the prediction is correct 85% of the time (which is a fairly common percentage). For this and all branch cache designs herein, a hit rate of 0.95 is used in all calculations (which is again typical). A branch execution time of 2.33 cycles is assumed for all non-predicted branches (0.667*2+0.333*3).

---
CPI for Processor with 2-state Branch Cache
CPI = 0.80 * (1 cycle/inst)           // non-branches
    + 0.20 * (0.05 * 2.33 cycles/inst) // non-predicted branches
    + 0.95 * 0.85 * 1 cycle/inst      // branches predicted correctly
    + 0.95 * 0.15 * 7 cycles/inst)    // branches predicted incorrectly
---

Therefore, the Processor with 2-state Branch Cache=1.18 cycles/instruction.

Third, consider a processor with a simple branch cache using a multi-state prediction model. For this prediction model, it is assumed that the prediction is correct 90% of the time (which is typical).

---
CPI for Processor with Multi-state Branch Cache
CPI = 0.80 * (1 cycle/inst)           // non-branches
    + 0.20 * (0.05 * 2.33 cycles/inst) // non-predicted branches
    + 0.95 * 0.90 * 1 cycle/inst      // branches predicted correctly
    + 0.95 * 0.10 * 7 cycles/inst)    // branches predicted incorrectly
---

Therefore, the Processor with Multi-state Branch Cache= 1.11 cycles/instruction.

Finally, consider a processor with a Branch Cache supporting zero-cycle instruction folding for taken branches plus maintaining a multi-state prediction model. This is the processor taught herein.

---

CPI for Processor with Multi-state Branch Cache & zero-cycle taken branches
CPI = 0.80 * (1 cycle/inst)              // non-branches
    + 0.20 * (0.05 * 2.33 cycles/inst)   // non-predicted branches
    + 0.95 * 0.90 * 0.333 * 1 cycle/inst // non-taken branches predicted correctly
    + 0.95 * 0.90 * 0.667 * 0 cycle/inst // taken branches predicted correctly
    + 0.95 * 0.10 * 7 cycles/inst)       // branches predicted incorrectly

---

Therefore, the Processor with Multi-state, Zero-cycle Branch Cache (which is the structure taught herein)=1.01 cycles/instruction which is markedly superior to other methods and architectures.

The following table summarizes the relative performance of the four processors listed above:

| Processor | CPI [cycles/inst] | Relative Performance |
| --- | --- | --- |
| CPU w/no Branch Cache | 1.27 | 1.00x |
| CPU w/2-state Branch Cache | 1.18 | 1.08x |
| CPU w/Multi-state Branch Cache | 1.11 | 1.14x |
| CPU w/Multi-state, Zero-cycle Branch Cache | 1.01 | 1.26x |

FIG. 1 (FIGS. 1—1 and 1–2 collectively) illustrates a data processing system in accordance with the present invention. FIG. 1 contains six major functional blocks which comprise the data processor. An instruction fetch pipeline (IFP) 22 is a independent pipeline used to prefetch instructions from an instruction memory unit (IMU) 26. An operand execution pipeline (OEP) 24 actually comprises dual pipelines which process the instructions prefetched by the IFP 22, generate the required operand addresses needed to access data operands from a data memory unit (DMU) 28, and perform the actual instruction execution. The instruction memory unit 26 and the data memory unit 28 (see FIG. 1–2) share a tablewalk controller 32 which is used to access memory-resident tables to perform virtual-to-physical address translation. Finally, a bus controller 30 interfaces between an external system bus 80 containing address conductors 66, data conductors 68 and control conductors 70 and the instruction memory unit 26 and the data memory unit 28.

The IFP 22 implements a four-stage pipeline for prefetching instructions. In the first stage, an instruction address generate unit 41 calculates the next prefetch address. The resulting address, the next instruction address in FIG. 1—1, is formed and then sent to a branch cache 40 and the instruction memory unit 26 via a signal labeled A. In the second stage, an instruction fetch unit 42 provides pipeline tracking of the current instruction address, while a branch cache 40 provides the table associating branch program counter (BPC) addresses with branch target addresses (BTAs) plus the associated control information. Once the requested instruction has been fetched by the instruction memory unit 26, it is sent back to the IFP 22 using an instruction data bus 62. The instruction data is stored in an instruction early decode unit 43 which uses a plurality of instruction bits to produce a plurality of associated predecode bits during the third stage. At the conclusion of the third stage, the instruction along with its associated predecode bits are then stored in an instruction buffer 44, which functions as a FIFO (first-in, first-out) buffer to decouple the prefetch operations of the IFP 22 from the execute operation of the OEP 24. Instructions are gated out from the instruction buffer 44 into the OEP 24 during the fourth stage of the prefetch pipeline.

The instruction memory unit 26 contains a content-addressable random-access memory for instruction prefetches along with the required control functions. An instruction address translation cache (IATC) 50 provides a memory-based table containing the most-recently-used virtual-to-physical address translations. If this table contains the desired mapping, the physical address is accessed and used to access the desired instruction with no delay. If the mapping is not resident in the IATC 50, the IMU 26 interfaces with the tablewalk controller 32 and the bus controller 30 to determine the required virtual-to-physical mapping which is then stored in the IATC 50. Using the physical instruction address provided by the IATC 50, an instruction memory controller 54 and an instruction cache 52 are accessed to fetch the desired instruction from the external memory storage (not illustrated) coupled to system bus 80. If the desired instruction is resident in the IMU 26, the instruction data is sent back to the IFP 22 using the instruction data bus 62. If the desired instruction data is not present in the IMU 26, the IFP 22 is stalled while the instruction memory controller 54 initiates the proper action by sending the desired physical address to the bus controller 30 over the data bus 58. The bus controller 30 then generates the appropriate system bus transaction (in this example, a read for the required instruction address) and places the appropriate values on the system bus 80, including the address bus 66 and the control bus 70.

When an external device (i.e., memory chip or the like) responds to the bus read cycle, it drives the desired value onto the data bus 68 which is then routed through the bus controller 30 back into the IMU 26 using the data bus 58. When the required bus cycle is completed, the instruction data is loaded into the instruction cache 52 and placed on the instruction data bus 62. At this time, the stall of the IFP 22 is released and the IFP 22 continues prefetching more instructions.

The OEP 24 implements a four-stage pipeline for the execution of the instructions prefetched by the IFP 22. In the first stage, a dispatcher 34 examines a pair of instructions previously read from the instruction buffer 44 to determine if the pair can be executed simultaneously (i.e., one instruction executed via one pipeline and the other instruction executed via the other pipeline). If there are no machine resource conflicts, the pair is dispatched, one to each pipeline, and the execution of the pair continues in the subsequent stages of the OEP 24. If there is a resource conflict, then only a single instruction is dispatched into the remaining OEP stages. After the dispatcher 34 has evaluated the instruction-pair, it sends control information back to allow the next set of instructions to be read from the instruction buffer 44. In the second stage of the execute pipeline, a pair of operand address generate units 45 and 46 calculate the required operand data memory virtual address. This OEP address is sent to the data memory unit 28 to identify the required data operand via the conductor labeled C. This set of conductors is also sent to the instruction address generate unit 41 to transmit the target address of branch instructions back into the IFP 22.

During the third stage of the execute pipeline, the required operands for the instructions currently being processed are fetched from a variety of sources as needed. Memory operands are read from the data memory unit and transmitted back to the OEP using an operand data bus 64. For integer instructions, register operands are read from an integer register file 36 at this time, while register operands for floating-point instructions are read from a floating-point register file 38 at the same pipeline stage. At the conclusion of this stage, all required operands have been accessed and are loaded into a trio of execute engines: the floating-point unit 47, and the dual integer units 48 and 49. For instructions which generate results destined for a program-visible register, the dual integer units 48 and 49 each provide a result bus which is used to transmit the updated value to the integer register file 36. Likewise, the floating-point unit 47 places its results onto a bus which is used to transmit the updated value to the floating-point register file 38. For instructions which generate updates of memory locations, the three execution units (47, 48, and 49) are connected to the operand data bus 64, which is used to transmit the updated image back to the data memory unit 28 via a connection labeled D.

The data memory unit 28 contains a content-addressable random-access memory for operand data references along with the required control functions. A data address translation cache (DATC) 58 provides a memory-based table containing the most-recently-used virtual-to-physical address translations. If this table contains the desired mapping, the physical address is accessed and used to access the desired operand data with no time delay. If the mapping is not resident in the DATC 58, the DMU 28 interfaces with the tablewalk controller 32 and the bus controller 30 to determine the required virtual-to-physical mapping which is then stored in the DATC 58 and used for the data access. Using the physical operand data address provided by the DATC 58, a data memory controller 56 and a data cache 60 are accessed to fetch the desired operand data from the memory storage (not illustrated in FIG. 1) which is externally coupled to bus 80. If the desired operand data is resident in unit 28, the operand data is sent back to the OEP 24 using the operand data bus 64. If the desired operand data is not present in the DMU 28, the OEP 24 is stalled while the data memory controller 56 initiates the proper action by sending the desired physical address to the bus controller 30 over the data bus 61.

The bus controller 30 then generates the appropriate system bus transaction (in this example, a read for the required operand data address) and places the appropriate values on the system bus 80, including the address bus 66 and the control bus 70. When an external device responds to the bus read cycle, it drives the desired value onto the data bus 68 which is then routed through the bus controller 30 back into the DMU 28 using the data bus 61. When the required bus cycle is completed, the operand data is loaded into the data cache 60 and placed on the operand data bus 64. At this time, the stall of the OEP 24 is released and the OEP 24 continues instruction execution.

Figures 1, 2:
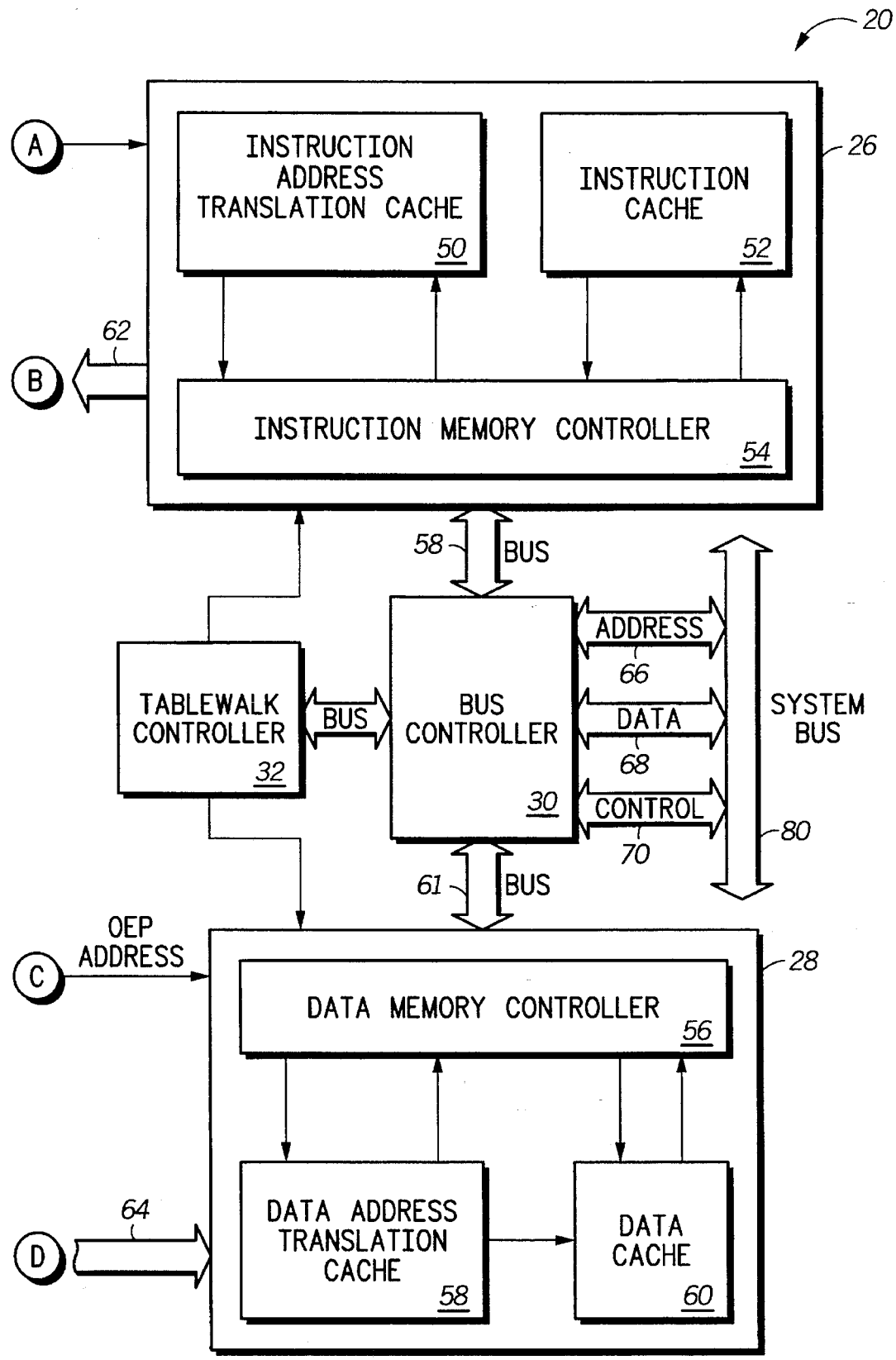
FIG. 2, illustrates, in a block diagram, the instruction address generator 41 of FIG. 1 in accordance with the present invention.
Figure 2:
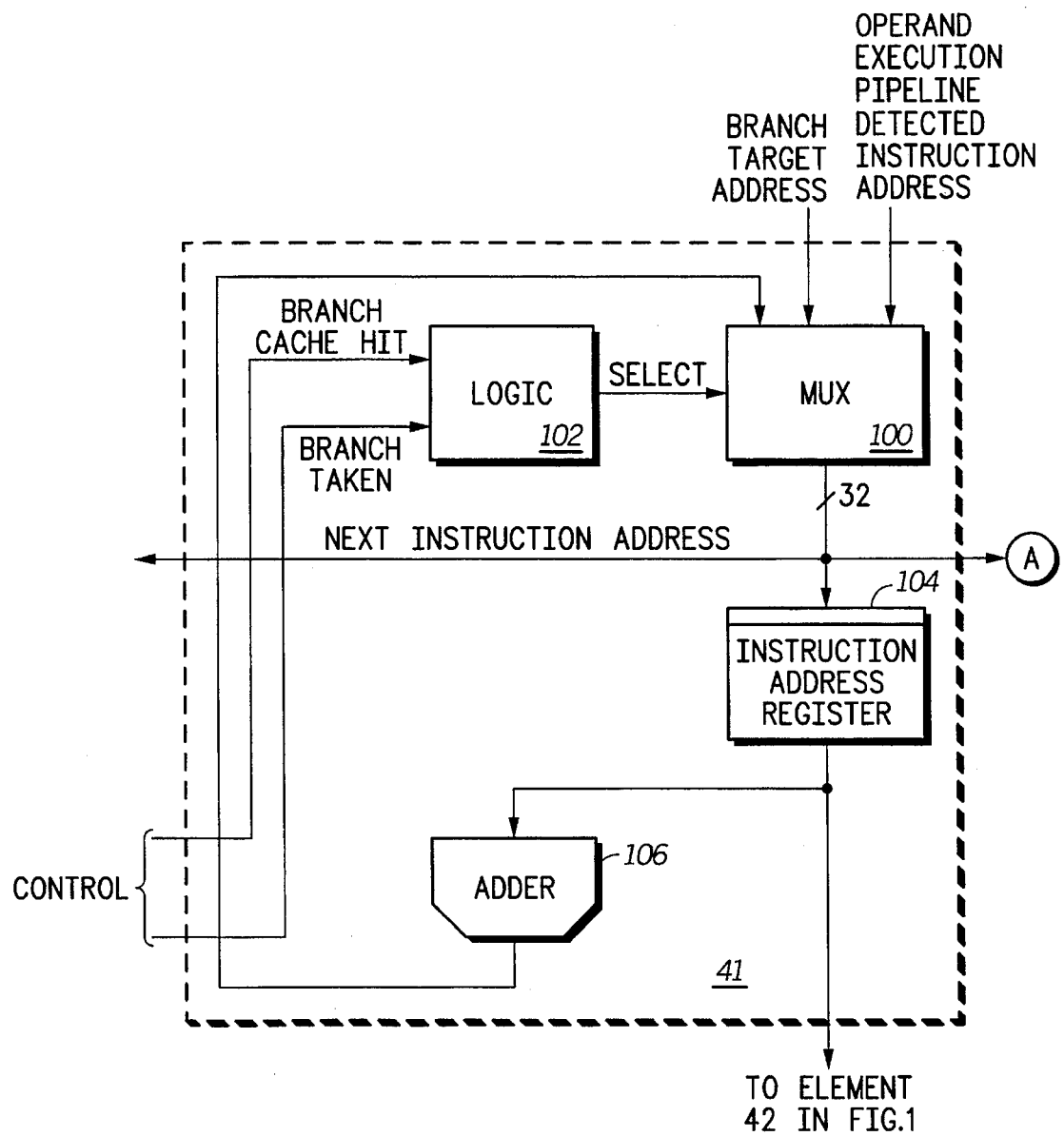

FIG. 2 illustrates the instruction address generate circuit 41 of FIG. 1—1 which is used to generate/provide addresses within the instruction fetch unit 22 of FIG. 1—1. FIG. 2 illustrates a multiplexer 100 which has three inputs and effectively calculates the next instruction prefetch address. The multiplexer 100 selects the next instruction address from one of the following sources: a branch target address calculated by the operand execution pipeline 24, a branch target address provided by the branch cache 40 or a sequential instruction address formed by adding an instruction address register 104 to a constant "K" in an adder 106. A typical value for K is 4 (i.e. longword address incrementing) but may be any other integer. The selection of the next instruction address in the multiplexer 100 is controlled by a logic circuit 102 which uses a priority scheme where OEP-detected target addresses are the highest priority, followed by target addresses for branches predicted as taken sourced by the branch cache 40 and finally, the next sequential address produced by the adder 106 is the lowest priority.

The next instruction address is transmitted to the branch cache 40 and the instruction memory unit 26 (via label A) during the first stage of the instruction fetch pipeline. The next instruction address is also routed internally to an instruction address register 104 which serves as a pipeline tracking storage element. The output of the instruction address register 104 drives the adder 106 which forms the next sequential instruction address. The calculation of the next sequential instruction address is simply formed as "last address"+constant, where the constant is determined by the number of instruction bits/bytes fetched each cycle. For a 32-bit instruction fetch (4 bytes), the constant is set to four. If a 64-bit instruction fetch (8 bytes) was implemented, the constant would be 8. In any case, the constant is fixed for a given implementation.

Figure 3:
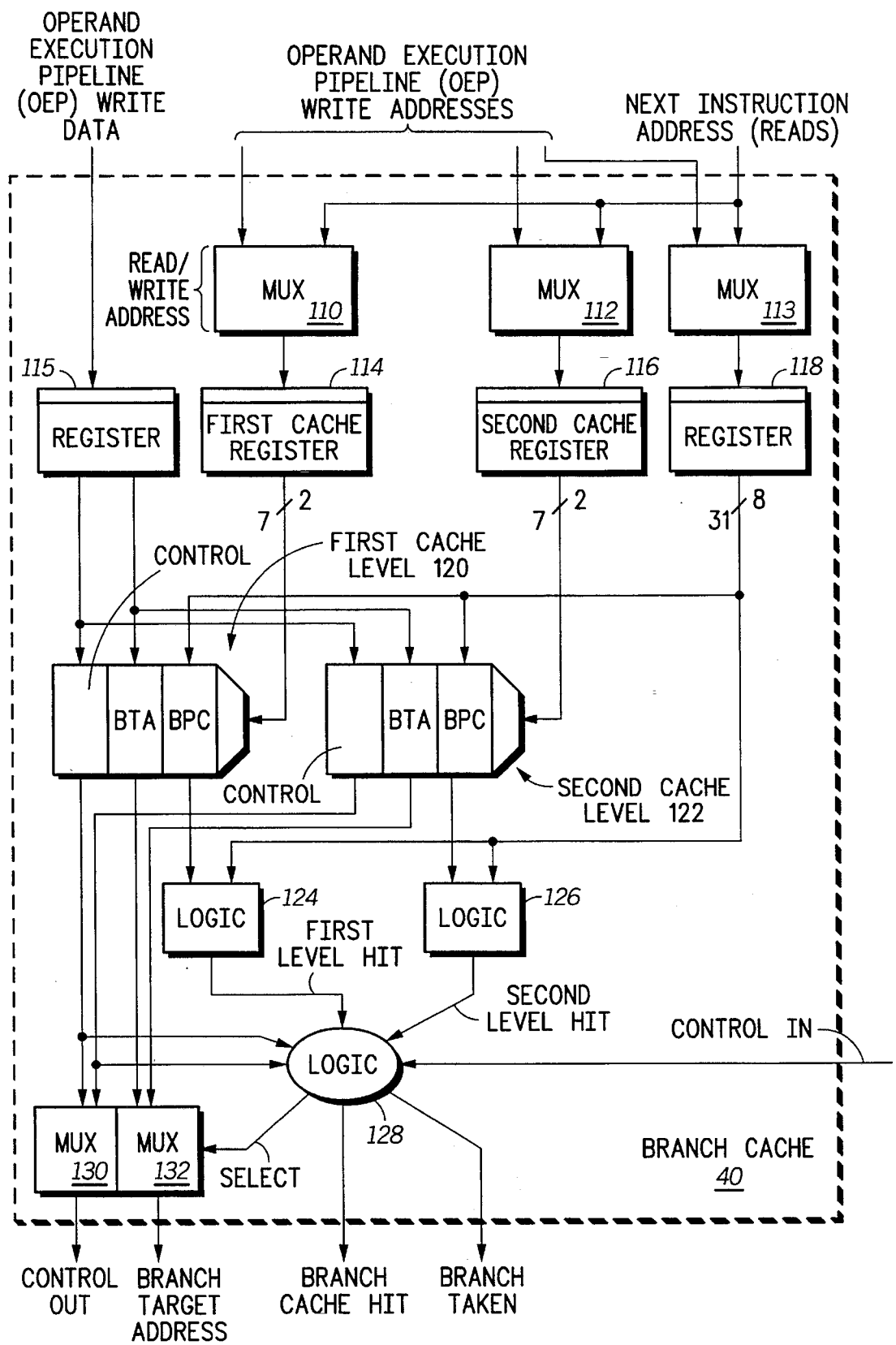
FIG. 3 illustrates, in a block diagram, the branch cache 40 of FIG. 1 in accordance with the present invention.

FIG. 3 illustrates, in more detail, a branch cache configuration which may be used in FIG. 1 or used in FIG. 2 to provide the branch target address, branch cache hit control signal, and branch taken control signal. Specifically, FIG. 3 illustrates a two-way, set-associative branch cache configuration for branch cache 40 of FIG. 1—1.

Specifically, FIG. 3 illustrates a multiplexer 110 which is used to select between a branch cache read address sourced by the instruction address generate unit 41 on the next instruction address conductors, and a branch cache write address sourced by the operand execution pipeline 24 using a unique set of conductors between unit 48 and unit 40 in FIG. 1—1. In the multiplexer 110, write operations are processed as a higher priority than read operations, so the branch cache write control signal effectively serves as the select. The output of the multiplexer 110 is sent to a first cache register 114. This selection logic is replicated in a multiplexer 112 and a second cache register 116. For the multiplexer 112, the output is selected from the branch cache read address sourced as the next instruction address from the instruction address generate unit 41, or another branch cache write address sourced by the operand execution unit 24. A multiplexer 113 is used to select the upper bits of the next instruction address or a branch cache write address. Consider the operation of the branch cache unit 40 for read and write operations separately.

For branch cache read operations during the first stage of the instruction fetch pipeline, the next instruction address is transmitted from the instruction address generate unit 41 and the low-order bits routed through both multiplexers 110 and 112 and loaded into the first and second cache registers, 114 and 116 respectively. The upper bits of the next instruction address bus are routed through multiplexer 113 and loaded into a register 118. During the second stage of the instruction fetch pipeline, the two cache registers 114, 116 are used to address the content-addressable, random-access branch cache memory, which has been implemented in 2 independently addressable arrays, called "levels." In FIG. 3 there is a level 120 and a level 122 illustrated. The storage of a first cache level 120 is separated into three fields: a branch program counter (BPC) field defining the upper bits of the instruction address of the branch instruction (or the instruction providing the linkage to [i.e., proceeding] the branch if instruction folding is performed), a branch target address (BTA) field defining the instruction address of the target of the branch, and a third field containing control information defining the direction of the branch (taken, not-taken) plus other functions. In general, the BTA field is used to store which address value is needed if the branch is taken. A second cache level 122 is structured in the exact same manner.

Each level (levels 120 and 122) in FIG. 3 contains 64 sets, defined by the 6-bit address contained in the first and second cache registers 114, 116. The BPC field is read from the first cache level 120 and sent to a logic circuit 124 which compares the BPC field with the upper bits of the next instruction address contained in the register 118. If the BPC value and the next instruction address bits stored in register 118 are equivalent, the logic 124 output signal is asserted indicating a branch cache "hit" has been detected in the first cache level 120. In a similar manner, the BPC field from the second cache level 122 is transmitted to a logic circuit 126, which performs a similar function of comparing the BPC and next instruction address register 118. If the bits are equivalent, the logic 126 output signal is asserted, indicating a branch cache "hit" in the second cache level 122 has been detected. A "hit" means that the desired branch location being accessed and contained via registers 114, 116, and 118 is stored and valid in the cache.

The individual "hit" signals from each level are sent to a logic circuit 128, which combines the "hit" signals with a set of control signals from the instruction fetch unit 42, to form control signals indicating whether or not a branch cache hit has been detected and whether or not the branch is predicted as taken (via Branch Cache Hit and Branch Taken control signals, respectively). The logic 128 provides select signals to muxes 130 and 132 for selecting the appropriate branch target address and branch control fields to be transmitted to other units in the instruction fetch pipeline 22. Specifically, the logic function 128 forms the control signals for both a multiplexer 130 to select the proper branch control values and a multiplexer 132 to select the proper branch target address from levels 120 and 122. The output of the multiplexer 130 is sent to the instruction early decode unit 43 where it is combined with the instruction and its associated predecode bits before being loaded into the FIFO instruction buffer 44. The output of the multiplexer 132 (i.e., Branch Target Address) is routed to the instruction address generate unit 41 along with the branch cache hit and branch taken control signals wherein unit 41 used this information to determine the proper next instruction address.

For branch cache write operations, the instruction fetch pipeline 22 is temporarily stalled, i.e., any read operations are postponed to allow the write operation to be performed. All branch cache write operations are generated in response to the execution completion of a branch instruction in the operand pipeline unit 24. The OEP 24 provides the appropriate storage elements to track/store the branch program counter and branch target address information when executing a branch instruction. Additionally, the OEP provides the storage elements to track/store the control information sourced by the branch cache 40 in the event of a branch cache hit. As the branch completes its execution, the branch direction (taken versus not-taken) is also determined. Using this information provided by the OEP 24, the branch cache 40 can then perform a write cycle to update the branch cache.

The actual write operation can take many forms: a new entry may be created, the branch direction field in the control section may require updating/changing due to the newly-performed execution, or an existing entry may need to be removed. For any type of write operation, the address is routed through the multiplexers 110 and 112 of FIG. 3 and loaded into the cache registers 114 and 116. At the same time, the OEP 24 sourced write data for the BTA and control fields is loaded into a register 115 and the BPC field data is routed through mux 113 and loaded into register 118. During the next cycle, the actual write of the random-access memory storage levels 120 and 122 is performed in one or more of the cache levels 120, 122. Again, depending on the write operations, one or a plurality of cache fields may be updated. The two cache registers 114 and 116 provide independent access to the cache storage 120 and 122. This provides the capability to perform two independent write operations (one in cache level 120 and another in cache level 122) within the same machine cycle. Once the single-cycle write operations are completed, the instruction fetch pipeline 22 is released to continue its prefetch operations.

Figure 4:
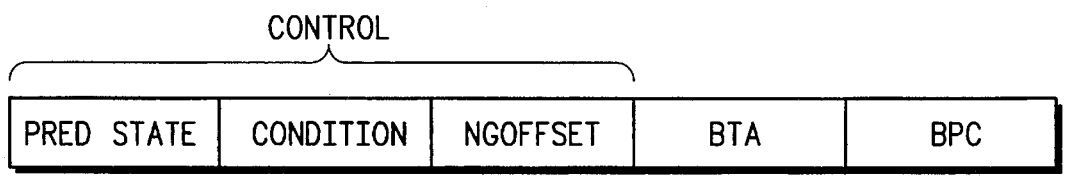
FIG. 4 illustrates, in a block diagram, one entry and the fields included in the one entry of the branch cache of FIG. 3 in accordance with the present invention.

FIG. 4 illustrates, in a block diagram form, a single branch cache entry field used within the cache levels 120 and 122 of FIG. 3. Each cache level 120 and 122 have a plurality of the entries as illustrated in FIG. 4 in order to store information for multiple branch instructions. FIG. 4 illustrates the three major fields contained within the branch cache storage: a control field, a branch target address (BTA) and a branch program counter (BPC). The control field consists of three sub-fields: a branch prediction state (PRED STATE), a branch condition (CONDITION) and an offset field used to re-establish the corrected instruction fetch stream in the event of a mis-prediction on a taken branch (NGOFFSET— no go offset).

Figure 5:
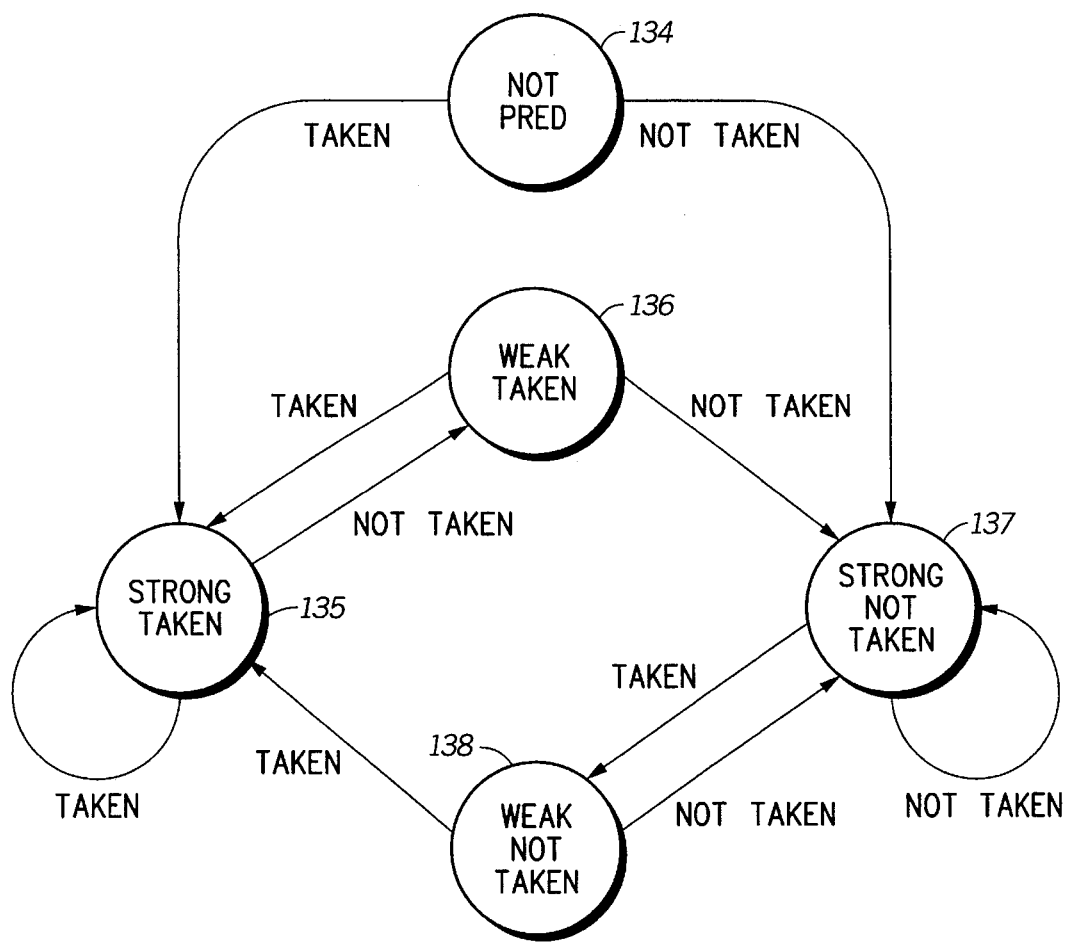
FIG. 5 illustrates, in a state diagram, the five states and ten transitions through which a branch prediction entry in FIG. 4 may be manipulated to improve or alter branch predictions in accordance with the present invention.

The first control sub-field, the PRED STATE, is a N-bit field (where N is a finite integer greater than one) which defines the predicted state of this branch instruction (see FIG. 5 for branch states). Typically, a value of zero indicates an invalid entry and non-zero values define the branch as predicted, either predicted as taken or non-taken with varying strengths.

The CONDITION field is used strictly in conjunction with the branch instruction folding techniques previously discussed. When a branch instruction is folded and the branch cache linkage made on the instruction preceding the branch, it is necessary to include the condition to be evaluated in the branch cache storage directly. This condition may be equal to, not equal to, greater than, less than, positive, negative, overflow, no overflow, etc. On subsequent executions of the linkage instruction, this condition field will be read out from the branch cache 40 and passed through the instruction early decode 43 and instruction buffer 44 before being sent to the operand execution pipeline 24. As the linkage instruction is executed by the OEP 24, this saved condition field is evaluated following the completion of the linkage instruction to determine the actual direction of the branch. If the branch instruction was predicted correctly, the instruction processing by the OEP 24 continues at the maximum rate. If the instruction was mis-predicted, then the IFP 22 and the OEP 24 must be aborted and the corrected instruction stream re-established.

The third control field, the NGOFFSET (nogo_offset), is specifically used in the above-described recovery actions in response to certain mis-predictions. Recall that the techniques of instruction folding are applied to branches which are predicted as taken (a not taken prediction cannot use instruction folding). If this prediction is incorrect (the branch is not taken instead of taken), the pipelines must be aborted and the corrected instruction stream established at the instruction immediately following the branch instruction. The instruction immediately following the branch instruction is the instruction to be executed once the branch is not taken. This new instruction address is calculated as:

recovery instruction address=instruction address of linkage instruction+nogo_offset where the nogo_offset value is calculated at the time the initial branch cache entry was made (since the program counter (PC) increments to the next instruction after the branch when the branch is first loaded/executed via unit 24, the NGOFFSET can be easily calculated when the branch is processed in unit 24).

The branch target address (BTA) represents the instruction address of the branch when it is taken and the branch program counter (BPC) defines the instruction address (i.e., memory location) of the branch instruction (or the linkage instruction in the event that the techniques of instruction folding can be applied to a predicted-as-taken branch).

FIG. 5 illustrates a state diagram. The state diagram of FIG. 5 has five states 134 through 138. The PREDICTION state field of the entry of FIG. 4 contains bits which identify for each branch entry in the branch cache 40, which state of the five states each branch entry is in. The state diagram of FIG. 5 represents one implementation of the multi-state prediction model previously discussed. Other multi-state models may be used with the invention branch cache 40 via expanding the bits in the PRED STATE field and/or adding/deleting states to the FIG. 5. For the model of FIG. 5, branches initially begin in state 134, the not-predicted state. This is due to the fact that the instruction has not been executed and has no history from which to predict branching. In other words, at this time, no information is known about past executions of the specific branch instruction. Upon the first execution of a not-predicted branch, a new branch cache entry is created based on the direction of this initial execution (i.e. either taken or not taken). If the not-predicted branch is taken, the prediction state PRED STATE in the cache entry for this specific branch instruction is set to the "strong taken" state 135. If the not-predicted branch is not taken, the prediction is set to the "strong not-taken" state 137. Once a branch instruction has entered one of the strong states (either 135 or 137), it will remain in that state as long as the branch direction remains the same as the initial direction. If the execution of a branch instruction which is predicted as "strong taken" results in a non-taken branch, a misprediction occurs and is handled as discussed above.

In general, due to the misprediction, the IFP 22 and OEP 24 pipelines must be aborted and the corrected instruction stream following the not-taken path must be established. Additionally, the branch cache entry shown in FIG. 4 is updated with the prediction state revised to indicate the branch is predicted as "weak taken", which is state 136 in FIG. 5. A similar process occurs when a branch is predicted as "strong not-taken" is mis-predicted and the taken branch occurs. Again, both pipelines must be aborted and the new instruction stream following the taken path established. For this situation, the prediction state (PRED STATE) is updated with a new state value signaling the branch as "weak not-taken", which is state 138. A branch instruction remains in the "weak" prediction states (states 136, 138) for only a single execution. Both the weak and strong not-taken states (states 137 and 138) assume the branch, on it's next execution will not be taken, and conversely both the weak and strong taken states (states 135 and 136) in FIG. 5 assume the branch, on it's next execution, will be taken. If the prediction is correct in states 136 or 138, the prediction state is again updated, this time returning to the corresponding "strong" state (i.e., state 136 would become state 135, and state 138 would become state 137). If the weak prediction is again incorrect, the IFP 22 and OEP 24 must be aborted and the corrected instruction stream established. Additionally, the prediction state would "change" direction: the weak taken state 136 would be revised to the strong not-taken state 137, or the weak not-take state 138 would become the strong taken state 135 as the situation dictates. The specific state transitions shown in FIG. 5 represent one implementation of a multi-state prediction model. There are numerous variations on the general concepts presented here. In general, it takes two mis-predictions in order for the PRED STATE to change prediction direction, for example, a transition from state 135 to state 137 in FIG. 5.

In general, assume that a branch is executed 40 times. The execution can be represented sequentially via a 1 for a taken branch and a 0 for a not taken branch. In theory, the two state prediction model functions best when the 40 sequential executions of the branch instruction results in a branch sequence with several consecutive 1's (branch taken repeatedly) and several consecutive 0's (branch not taken repeatedly):

Example A

00000111111111100000001111111110000000000 ...
A     B       C    D       E

In the above stream the model begins at A and predicts that the branch is "not-taken". At point B the branch is predicted incorrectly, the pipelines must be flushed, and the cache state for this one branch changes to a "taken state". Again at points C, D, and E the branch is predicted incorrectly, the pipelines must be flushed, and the cache state for this one branch changes to the opposite state.

Experimentation has shown that branches rarely result in the pattern listed above but instead are usually either similar to the following sequence:

Example B

11111111101111111111111011111111011111111 ...
A       B           C         D

In the above practical Example B, the five-state model of FIG. 5 is best adapted whereas the two state model is not efficient. In the Example B at point A, the branch is set from state 134 to state 135 in FIG. 5. At points B, C, and D, the five-state model goes from state 135 to state 136 and back to state 135. Therefore, the state model of FIG. 5 results in three occurrences of mis-predicition resulting in pipeline flushing which is time consuming and roughly 37 proper predictions which saved a larger amount of time. The two state method would have resulting in two mispredictions around each of points B, C, and D in Example B thereby being less efficient than the state diagram of FIG. 5. In general, in order for the model of FIG. 5 to mis-predict twice in a row, a sequence of 00 (two consecutive not-taken branches) must occur in the above sequence in Example B. Measurements of typical code show that consecutive mispredictions are not encountered as often as other sequences (such as 0001000 and 1110111) for which the five-state model of FIG. 5 is optimized.

Consider the following code example:

| | |
|---|---|
| 1000: MOVE A to B | This is the beginning of the loop |
| 1004: ADD 1 to COUNT | Increment the loop counter |
| 1008: COMPARE COUNT to 200 | Compare the present value of COUNT |

-continued

| 100C: BRANCH NOT EQUAL 1000 | to the final value of 200 Branch to target address 1000 ff COUNT is not equal to 200 |
|---|---|
| 1010: Next Instruction . . . | |

The initial state of the branch state has the PREDICTION STATE set to the "not predicted" state 134 (see FIG. 5). During the first iteration of the loop in the example, the conditional branch, the BRANCH NOT EQUAL (BNE), at instruction address 100C would not be predicted due to no entry for this branch instruction in the branch cache. The code example is written to execute the loop formed by the four instructions at addresses 1000, 1004, 1008, 100C two hundred times before continuing with the "Next Instruction" at address 1010. This type of loop is extremely typical for many applications. The first execution of the BNE instruction would produce a taken branch. As a result, the following branch cache entry is created:

| PREDICTION STATE | = strong taken | (state 135 in FIG. 5) |
|---|---|---|
| CONDITION | = not equal | (taken from the branch instruction at address 100C) |
| NGOFFSET | = 8 | (value which needs to be added to BPC to get the address of the instruction following the BRANCH (i.e., address 1010)) |
| BTA | = 1000 | (target address of beginning of loop) |
| BPC | = 1008 | (BNE instruction is "folded" into the COMPARE instruction) |

In the above example, the loop branch (the BNE instruction) would remain in this state for the next 199 iterations of the loop. During all of these iterations, the branch would be properly predicted and executed in zero clock cycles. Finally, on the 200th iteration, the BNE would again be predicted as strong taken, but the exit condition for the BRANCH is satisfied and the branch is not taken. The resulting mis-prediction will cause the IFP 22 and the OEP 24 to be aborted and the new instruction stream established by summing the BPC (1008) with the NGOFFSET (8) to form the recovery address of 1010, which is where the PC must go to get the next valid instruction in the instruction stream. Additionally, the branch cache entry for this instruction is updated using the prediction state model shown in FIG. 5. Specifically, the PREDICTION STATE is updated to signal a "weak taken" branch, state 136 in FIG. 5. All other fields remain unchanged in this particular branch cache entry. The instruction execution continues with the "Next Instruction."

On the next activation of this code segment, the first iteration of the branch instruction will produce a "weak taken" prediction. This branch instruction is taken, so the branch cache entry must again be changed to update the prediction state. Using the prediction state model of FIG. 5, this entry is updated back to the to a "strong taken" branch, state 135 in FIG. 5. Note in this example, since the direction of the branch prediction state did not change (only the relative strength of the prediction changed), the IFP 22 and OEP 24 were not aborted, but continued processing unlike the two-state model discussed above.

Another example of a more complex code sequence is shown below. This is a code segment taken from an actual sort program:

Compare Consecutive Elements:

| 2000: | COMPARE A[i] to A[i+1] | Compare two sequential elements |
|---|---|---|
| 2004: | BRANCH LESS THAN OR EQUAL TO 2018 | |
| | | Exchange Consecutive Elements: |
| 2008: | MOVE A[i] to TEMP | Copy first element to temporary storage |
| 200C: | MOVE A[i+1] to A[i] | Move second element to "i"-th location |
| 2010: | MOVE TEMP to A[i+1] | Move first element to "i+1"-th location |
| 2014: | Increment i | Increment array pointer |
| Continue: | | |
| 2018: | Next Instruction | |

In this example, two consecutive elements in an array are compared. If the second element is smaller than the first element, the two elements are exchanged in the array. Using this type of algorithm, the entire list of elements is eventually sorted in increasing numerical order. For this example, consider the branch instruction at address location 2004. Unlike the previous example where the "loop" branch instruction was most often a taken branch, the direction of the BRANCH LESS THAN OR EQUAL TO (BLE) instruction is considerably more random. In fact, the branch's taken or not-taken direction is a function of the numbers in the array-to-be-sorted, and these numbers may be completely random in nature so that the branch is a 50%/50% branch.

Assume the first execution of the BLE instruction at address 2004 is not taken. For this case, the multi-state prediction model shown in FIG. 5 will produce a branch cache entry of the form:

| PREDICTION STATE | = strong not-taken |
|---|---|
| CONDITION | = less than or equal to |
| NGOFFSET | = 4 |
| BTA | = 2018 (target address of Continue) |
| BPC | = 2004 (BLE instruction address) |

Notice that the BPC reflects no branch instruction folding since this folding only occurs for a branch-taken prediction.

Thus, the initial branch cache write creates an entry mapped into state 137. The next execution of this code produces a strong, not-taken branch prediction. Note the branch cache read occurring during the second stage of the IFP produces a "hit" indication, as shown in FIG. 3, but the branch taken signal is negated (since the prediction is not-taken). This combination causes the generation of the next instruction address shown in FIG. 2 to continue to form sequential addresses (the logic function 102 selects the next sequential address formed by the adder 106 gated through the mux 100). If this second execution produces a taken branch, the IFP 22 and OEP 24 pipelines are aborted and the new instruction stream at address 2018 established. Additionally, the existing branch cache entry is revised to update the prediction state based on FIG. 5. Specifically, the PREDICTION STATE is updated to state 138, weak not-taken.

The third execution of the BLE instruction again makes a not-taken prediction due to the state 138 in the branch cache entry. If this execution produces a taken branch, the IFP 22 and the OEP 24 are aborted and the new instruction stream at target address 2018 established. The updating of the branch cache entry at this time creates a special situation. The prediction model in FIG. 5 indicates the branch should now be marked as strong taken, state 135. However, the utilization of the multi-state prediction model in conjunction with the concept of instruction folding creates special requirements for the correct operation at this time. These special requirements are not needed or suggested in any conventional branch cache. In one implementation, the BLE instruction would simply be marked with the strong taken prediction state, but that approach ignores all the performance benefits obtained when instruction folding is utilized to create zero-cycle branch instructions. Note that in this particular example, the instruction folding technique changes the cache entry location since the location is determined by the lower bits of the BPC. This requires clearing the entry at the existing cache location and creating a new entry at the address of the instruction providing the linkage.

The novel approach presented herein is the capability to perform two write cycles in a single machine cycle to these two different branch cache storage locations:

First, the existing branch cache entry is made invalid by setting the prediction state to "not predicted."

| PREDICTION STATE | = not predicted |
| --- | --- |
| CONDITION | = less than or equal to |
| NGOFFSET | = 4 |
| BTA | 2018 (target address of Continue) |
| BPC | 2004 (BLE instruction address) |

At the same time (i.e. a parallel write is occurring), a new branch cache entry is created which is defined as:

| PREDICTION STATE | = strong taken |
| --- | --- |
| CONDMON | = less than or equal to |
| NGOFFSET | = 8 |
| BTA | = 2018 (target address of Continue) |
| BPC | = 2000 (BLE instruction "folded" into the COMPARE) |

Notice that the BPC in this branch cache entry takes advantage of the instruction folding principle by setting BPC to the address location of the instruction preceding the branch instruction.

Consider the above-described dual-write of the branch cache in more detail. Assume that the original entry existed in the first cache level 120 as shown in FIG. 3. Once the branch is executed for the third time and determined to be taken, the branch cache write addresses are controlled by the OEP 24 via the two read/write address multiplexers 110 and 112. In this example, the existing entry at BPC address 2004 in the first cache level 120 requires invalidation, while a new entry at BPC address 2000 must be created. In the branch cache taught herein, the new entry is always written into the "other" cache level. This means that one register (register 114) in FIG. 3 writes to only one level (level 120) while another register (register 116) writes to another level (level 122). For other embodiments, more than two levels may exist and each register can select between multiple levels (see FIG. 6).

For the above example, since the existing entry resides in the first cache level 120, the new entry is created in the second cache level 122. Thus, to setup the write cycle, mux 110 (of FIG. 3) selects the address of the existing entry (BPC=2004) and mux 112 (of FIG. 3) selects the address of the new entry (BPC=2000). These two write addresses are stored in the first cache register 114 and the second cache register 116, respectively. During the actual branch cache write cycle, the first cache register 114 accesses the existing entry which is invalidated by setting the prediction state to "not predicted." At the same time (i.e. in parallel), the second cache register 116 is accessing the second cache level 122 at the appropriate location to create a new entry at BPC=2000.

Figure 6:
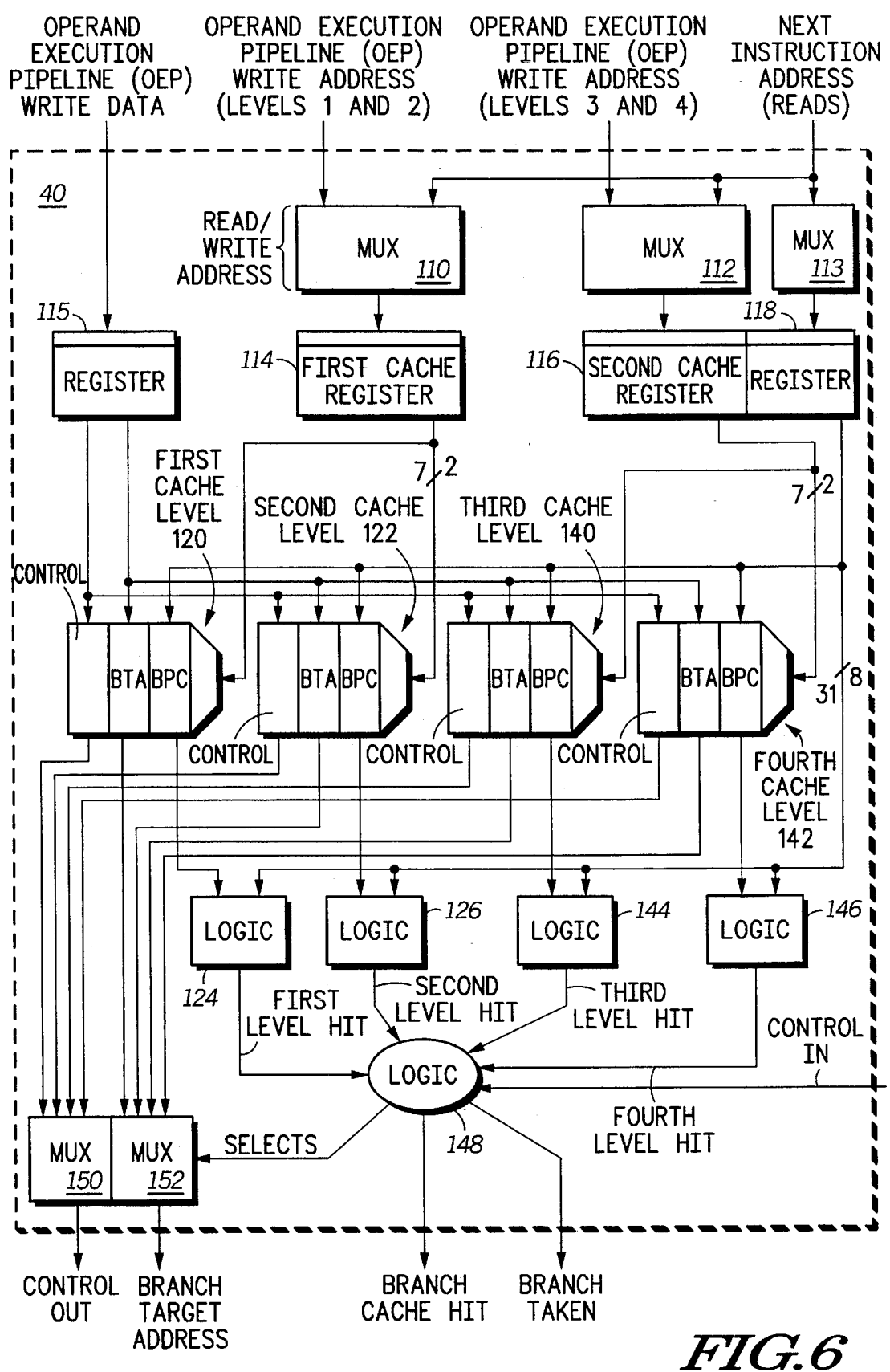
FIG. 6 illustrates, in a block diagram, a structure similar to FIG. 3 except that the cache structure of FIG. 6 has been modified to a four level cache in accordance with the present invention.

FIG. 6 illustrates a branch cache 40 which uses a 4-way set associative cache. The MUX 110, MUX 112, and inputs to the MUXs 110 and 112 are analogous to the corresponding numbered elements of FIG. 3. FIG. 6 illustrates four cache levels 120, 122, 140, and 142. The dual write registers 114 and 116 are similar to the registers 114 and 116 illustrated in FIG. 3 with the exception that these registers 114 and 116 now can each write to one of two cache levels. Instead of two logic address comparators for BPC as in FIG. 3, four logic circuits 124, 126, 144, and 146 are needed, one for each of the levels 120, 122, 140, and 142. The logic 148 of FIG. 6 is analogous to the logic 128 of FIG. 3 and the MUXs 130 and 132 of FIG. 3 are analogous to the MUXs 150 and 152 of FIG. 6. The MUXs 150 and 152 each have four inputs to select from, one from each level of the branch cache storage space.

While the present invention has been illustrated and described with reference to specific embodiments, further modifications and improvements will occur to those skilled in the art. For example, many different types of cache with many numbers of levels exist in the art. In general, an N-way level set associative cache or any like cache structure will work as the branch cache memory described herein. Other multi-state prediction models may be used instead of FIG. 5 and the transitions between states in FIG. 5 may vary. For example, instead of state 136 transitioning to state 137 on a NOT TAKEN branch, the state of FIG. 5 could transition from state 136 to state 138. Using this state model, three NOT TAKEN states are required in order to transfer from state 135 to 137 instead of the two NOT TAKEN states as required in FIG. 5 as currently illustrated. The branch cache taught herein may be used in any processor or computer architecture. Other fields may be added to the branch entry illustrated in FIG. 4 to serve other purposes. It is to be understood, therefore, that this invention is not limited to the particular forms illustrated and that it is intended in the appended claims to cover all modifications that do not depart from the spirit and scope of this invention.

What is claimed is:

1. A data processing system having a branch cache which performs parallel writes to enable branch instruction folding, the data processing system comprising:

an execution unit;

the branch cache being coupled to the execution unit and having a plurality of storage locations, each storage location having a plurality of history bits to indicate whether a branch is likely to be taken or not likely to be taken, the branch cache being N-way set associative wherein N is a finite positive integer greater than one, the branch cache having at least two registers comprising a first address register and a second address register, the first address register being used to store a first plurality of address bits and the second address register being used to store a second plurality of address bits, the first plurality of address bits being different from the second plurality of address bits during at least one branch cache write operation so that two different locations in the branch cache are written in parallel to the branch cache.

2. The data processing system of claim 1 wherein the branch cache is an N-way set associative cache where N is a finite integer greater than two and wherein the the first register is used to perform write operations to a first level of the N-way set associative branch cache and the second register is used to perform write operations to a second level of the N-way set associative branch cache wherein a location written in the first level of the branch cache is different in address location from the second location written in the second level of the branch cache.

3. The data processing system of claim 1 wherein the branch cache comprises a plurality of cache entries wherein each cache entry has five fields: (1) a branch program counter field, wherein bits which identify the address at which a branch instruction resides, are stored; (2) a branch taken field wherein bits, which identify which next address is to be fetched if the branch is taken, are stored; (3) a prediction field wherein the plurality of history bits are stored; (4) a condition field which stores a plurality of bits used to indicate which condition must be satisfied in order for the branch instruction to be taken; and (5) a branch not taken offset, which stored bits used to identify where to fetch a next instruction if the branch is not taken.

4. The data processing system of claim 1 wherein the plurality of history bits define at least four unique branch prediction states.

5. The data processing system of claim 4 wherein the at least four unique branch prediction states are: (1) a first state which indicates that the branch instruction is likely to be taken; (2) a second state which indicates that the branch instruction is likely to be taken but not as likely as a branch instruction in the first state; (3) a third state which indicates that the branch instruction is not likely to be taken; and (4) a fourth state which indicates that the branch instruction is not likely to be taken but more likely to be taken than a branch instruction which is in the third state.

6. The data processing system of claim 4 wherein the at least four unique branch prediction states are: (1) a first state which indicates that the branch instruction is likely to be taken; (2) a second state which indicates that the branch instruction is not likely to be taken; (3) a first transition state which is used to transition from the first state to the second state; and (4) a second transition state which is used to transition from the second state to the first state.

7. The data processing system of claim 6 wherein the first transition state and the second transition state are entered upon a first execution of the branch instruction and exited on the next execution of the branch instruction directly after the first execution of the branch instruction.

8. The data processing system of claim 4 wherein the at least four unique branch prediction states are: (1) a strongly taken state; (2) a weakly taken state; (3) a strongly not taken state; and (4) a weakly not taken state.

9. The data processing system of claim 1 wherein the two branch cache entries are written in parallel when a branch instruction entry in the branch cache transitions from a strongly taken state to a strongly not taken state.

10. The data processing system of claim 1 wherein the two branch cache entries are written in parallel when a branch instruction entry in the branch cache transitions from a strongly not taken state to a strongly taken state.

11. The data processing system of claim 1 wherein the two branch cache entries are written in parallel when the plurality of history bits of a branch instruction entry in the branch cache transitions from a first state which indicates that the branch instruction is likely to be taken to a second state which indicates that the branch instruction is not likely to be taken.

12. The data processing system of claim 1 wherein the two branch cache entries are written in parallel when the plurality of history bits of a branch instruction entry in the branch cache transitions from a first state which indicates that the branch instruction is not likely to be taken to a second state which indicates that the branch instruction is likely to be taken.

13. The data processing system of claim 1 wherein the two branch cache entries written in parallel involve a first write operation and a second write operation, the first write operation being used to invalidate an entry in the branch cache and the second write being used to create a new entry in the branch cache.

14. The data processing system of claim 1 wherein the branch cache is an N-way level cache wherein N is a finite integer greater than one, the two branch cache entries written in parallel involve a first write operation and a second write operation, the first write operation being used to invalidate an entry in a first level of the branch cache and the second write being used to create a new entry in a second level of the branch cache.

15. The data processing system of claim 1 wherein data processing system is executing a plurality of instructions wherein the plurality of instructions includes a branch instruction and an instruction executed sequentially before the branch instruction, the branch cache creating an entry in the branch cache when the branch instruction is executed for a first time.

16. The data processing system of claim 15 wherein the entry in the cache which corresponds to the branch instruction has a plurality of history bits set to a binary value which indicates that the branch instruction is currently in an unpredicted state.

17. The data processing system of claim 15 wherein the execution unit is a pipelined execution unit and wherein the entry in the cache which corresponds to the branch instruction is used to process the branch instruction without placing the branch instruction into the pipelined execution unit for pipeline execution.

18. The data processing system of claim 15 wherein the branch cache has a first valid entry which corresponds to the address of the instruction executed sequentially before the branch instruction if the branch instruction is most likely taken or the branch cache has an second valid entry which corresponds to the address of the branch instruction if the branch instruction is most likely not taken.

19. The data processing system of claim 18 wherein the branch cache invalidates the first valid entry and creates the second valid entry if the branch instruction is going from a state of "branch most likely taken" to a state of "branch most likely not taken".

20. The data processing system of claim 19 wherein the invalidating and the creating are performed via two parallel write operations occurring within the branch cache to two different address locations.

21. The data processing system of claim 18 wherein the branch cache invalidates the second valid entry and creates the first valid entry if the branch instruction is going from a state of "branch most likely not taken" to a state of "branch most likely taken".

22. The data processing system of claim 21 wherein the invalidating and the creating are performed via two parallel write operations occurring within the branch cache.

23. The data processing system of claim 21 wherein the invalidating and the creating are performed via two parallel write operations occurring within the branch cache for a single branch instruction.

24. The data processing system of claim 1 wherein the branch cache is an N-way level cache where N is a finite integer greater than one and M is a cache level number between 1 and N which defined which level of the N-way cache is being accessed, the cache level number being communicated to the execution unit if the execution unit is processing a branch instruction which has a valid entry stored in a level of the N-way level cache.

25. The data processing system of claim 1 wherein the branch cache comprises:

a first register for writing an entry in the branch cache; and a second register for writing an entry in the branch cache wherein the first and second register are connected so that the first and second registers may operate in parallel to perform parallel write operations to the branch cache.

26. A data processing system comprising:

an execution unit;

a branch cache having a plurality of storage locations each storage locations having five storage fields, a first storage field for storing a plurality of bits corresponding to an address at which a branch instruction is stored, a second storage field for storing a destination address which is used if the branch is taken, a third storage field which stores a plurality of bits which indicates a history of an execution direction of the branch instruction, a fourth storage field which stores a condition upon which the branch is to be taken so that proper execution flow can be ensured after the branch instruction has been folded, and a fifth storage field which contains information which is used to determine which address is executed if the branch is not taken.

27. The data processing system of claim 26 wherein the third storage field is used to indicate one of four possible states, the four possible states being: (1) a first state which indicates that the branch instruction is likely to be taken; (2) a second state which indicates that the branch instruction is likely to be taken but not as likely as a branch instruction in the first state; (3) a third state which indicates that the branch instruction is not likely to be taken; and (4) a fourth state which indicates that the branch instruction is not likely to be taken but more likely to be taken than a branch instruction which is in the third state.

28. The data processing system of claim 26 wherein the third storage field is used to indicate one of four possible states, the four possible states being: (1) a first state which indicates that the branch instruction is likely to be taken; (2) a second state which indicates that the branch instruction is not likely to be taken; (3) a first transition state which is used to transition from the first state to the second state; and (4) a second transition state which is used to transition from the second state to the first state.

29. The data processing system of claim 26 wherein the branch cache comprises:

a first register for writing an entry in the branch cache; and a second register for writing an entry in the branch cache wherein the first and second register are connected to the branch cache in a manner which allows the first and second registers to operate in parallel to perform parallel write operations to the branch cache to differently-addressed locations.

30. The data processing system of claim 26 wherein the fourth storage field allows a branch instruction to be executed in zero clock cycles by determining a branch condition during the execution of an instruction occurring sequentially before the branch instruction.

31. The data processing system of claim 30 wherein the branch instruction is not transferred to a pipeline in the execution unit if the branch can be executed in zero clock cycles.

32. A data processing system which unfolds branch instruction is a branch cache via parallel write operation to the branch cache, the data processing system comprising:

an execution unit; and the branch cache having a plurality of storage locations each storage location having a first storage field for predicting whether the branch will be taken or not taken and a second storage field for selectively allowing a condition of a branch instruction to be evaluated during the execution of an instruction which is sequentially executed before the branch instruction so that the branch instruction can execute in zero execution unit clock cycles, the branch cache storage field for predicting whether the branch will be taken or not taken having at least four prediction states.

33. The data processing system of claim 32 wherein the first storage field is used to indicate one of four possible states, the four possible states being: (1) a first state which indicates that the branch instruction is likely to be taken; (2) a second state which indicates that the branch instruction is likely to be taken but not as likely as a branch instruction in the first state; (3) a third state which indicates that the branch instruction is not likely to be taken; and (4) a fourth state which indicates that the branch instruction is not likely to be taken but more likely to be taken than a branch instruction which is in the third state.

34. The data processing system of claim 32 wherein the first storage field is loaded with a no-prediction value in order to invalidate a cache entry.

35. The data processing system of claim 32 wherein the branch cache comprises:

a first register for writing an entry in the branch cache; and a second register for writing an entry in the branch cache wherein the first and second register are connected to the branch cache in a manner which allows the first and second registers to operate in parallel to perform parallel write operations to the branch cache.

36. A data processor comprising:

a pipelined data execution unit;

an address generation circuit coupled to the pipelined data execution unit comprising:

a multiplexer having a first input, a second input, a third input for receiving addresses from the pipelined execution unit, an address output, and a plurality of select lines which are used to determine which input of the first, second, and third inputs is connected to the address output; and an adder having an input coupled to the address output of the multiplexer, the adder circuit adding a constant to the address output to provide an incremented address output which is coupled to the first input of the multiplexer; and a branch cache coupled to the pipelined data execution unit and having an address output coupled to the second input of the multiplexer, the branch cache being an N-way level cache which has a first register and a second register for performing parallel writes to the branch cache so that branch instructions can be folded to preceding computer instructions and unfolded from preceding computer instructions in the branch cache.

37. A data processor comprising:

a pipelined data execution unit;

an address generation circuit coupled to the pipelined data execution unit comprising:

a multiplexer having a first input, a second input, a third input for receiving addresses from the pipelined execution unit, an address output, and a plurality of select lines which are used to determine which input of the first, second, and third inputs is connected to the address output; and an adder having an input coupled to the address output of the multiplexer, the adder circuit adding a constant to the address output to provide an incremented address output which is coupled to the first input of the multiplexer; and a branch cache coupled having an address output coupled to the second input of the multiplexer, each entry of the branch cache having a multi-state branch prediction storage field and a condition field which allows a branch instruction which has an entry in the branch cache to be executed in zero cycles by folding the branch condition in with an instruction Which precedes the branch instruction in execution flow.

38. A method for prefetching instructions to improve performance of a data processor, the method comprising the steps of:

generating an instruction fetch address;

fetching an instruction from a location specified by the instruction fetch address;

executing the instruction;

evaluating a state of the data processor as reflected in a programmer's model if the instruction is a branch instruction to determine a direction of execution resulting from the branch instruction;

storing a new entry into a branch cache if the instruction is a branch instruction and the branch instruction has no previous history recorded in the branch cache;

updating an existing branch cache entry if the instruction is a branch instruction and the branch instruction has previous history recorded in the branch cache, the history recorded in the branch cache having more than two states wherein a first state identifies that the branch is likely to be taken and a second state which indicates that the branch is likely not to be taken; and performing two writes, which at least partially overlap in time, to the branch cache to both create a new branch cache entry and invalidate a current branch cache entry if current branch cache entry changes from the first state to the second state or from the second state to the first state in order to change an address at which the branch is to be evaluated.

39. In a data processing system, a branch cache comprising:

an N-way cache wherein N is a finite integer greater than zero and indicates that a cache has N storage levels, each storage level of the N-way cache having a plurality of storage locations, each storage location being coupled to store a branch program counter (BPC) location and a branch target address (BTA), the branch program counter being an address at which a branch operation is to be executed by the data processing system and the branch target address being a location to which the branch operation will direct program execution flow if the branch operation is taken;

a first register coupled to a first storage level of the N storage levels, the first register being used to write a first set of bits to the first storage level of the N storage levels; and a second register coupled to a second storage level of the N storage levels, the second storage level being different from the first storage level and being used to write a second set of bits to the second storage level of the N storage levels where the second set of bits are different in value from the first set of bits, and wherein the first register and the second register write the first and second sets of bits respectively to the first and second storage levels of the N storage levels in parallel, the first and second registers being used to change a number of clock cycles that the data processing system consumes in order to evaluate the branch operation.

40. The data processing system of claim 39 wherein the first register is used to invalidate an entry in the first storage level to form an invalidated entry, the entry in the first storage level previously storing information pertaining to a selected branch instruction, the second register creating an entry in the second storage level to replace the invalidated entry with an updated entry, the updated entry including updated information pertaining to the selected branch instruction.

41. A method for handling instructions to improve performance of a data processor, the method comprising the steps of:

(a) reading a branch instruction into the data processor;

(b) predicting whether the branch will be taken or not-taken;

(c) storing data related to the branch instruction in the branch cache regardless of whether the branch instruction is predicted as taken or not taken;

(d) determining that a subsequent execution of the branch instruction should be predicted in a manner different from that determined in step (b); and (e) simultaneously writing two different address locations in the branch cache using a first write operation and a second write operation performed in parallel, the first write operation being used to invalidate a branch cache entry in the branch cache which corresponds to the branch instruction as predicted in step (b), and a second write operation being used to create an entry in the branch cache which corresponds to the branch instruction as predicted in step (d) wherein the branch instruction from step (b) was evaluated at a first address in execution flow and the branch instruction from step (d) is evaluated at a second address of the execution flow wherein the second address is different from the first address.

42. The method of claim 41 wherein one of either the step (b) or step (d) comprises:

determining that the branch instruction is either strongly taken, strongly not-taken, weakly taken, or weakly not-taken.

43. The method of claim 41 wherein the step (e) comprises:

writing a condition field within the branch cache for the branch instruction wherein the condition field is a binary indicator which indicates which type of logical test is to be performed in order to determine an execution flow direction of the branch instruction.

44. The method of claim 41 wherein the step (b) allows branch instructions predicted as taken to be executed in zero clock cycles and allows branch instructions predicted as not-taken to be executed in one clock cycle.

45. The method of claim 41 wherein the step (e) comprises:

providing two address registers coupled within the branch cache to prove two different addresses which allow for the performance of both the first write operation and the second write operation where each of the first write operation and the second write operation involve different addresses.

46. The method of claim 41 wherein the step (e) comprises:

providing two data registers coupled within the branch cache to prove two different data values which allow for the performance of both the first write operation and the second write operation where each of the first write operation and the second write operation involve different data.

* * * * *